Figure 1:
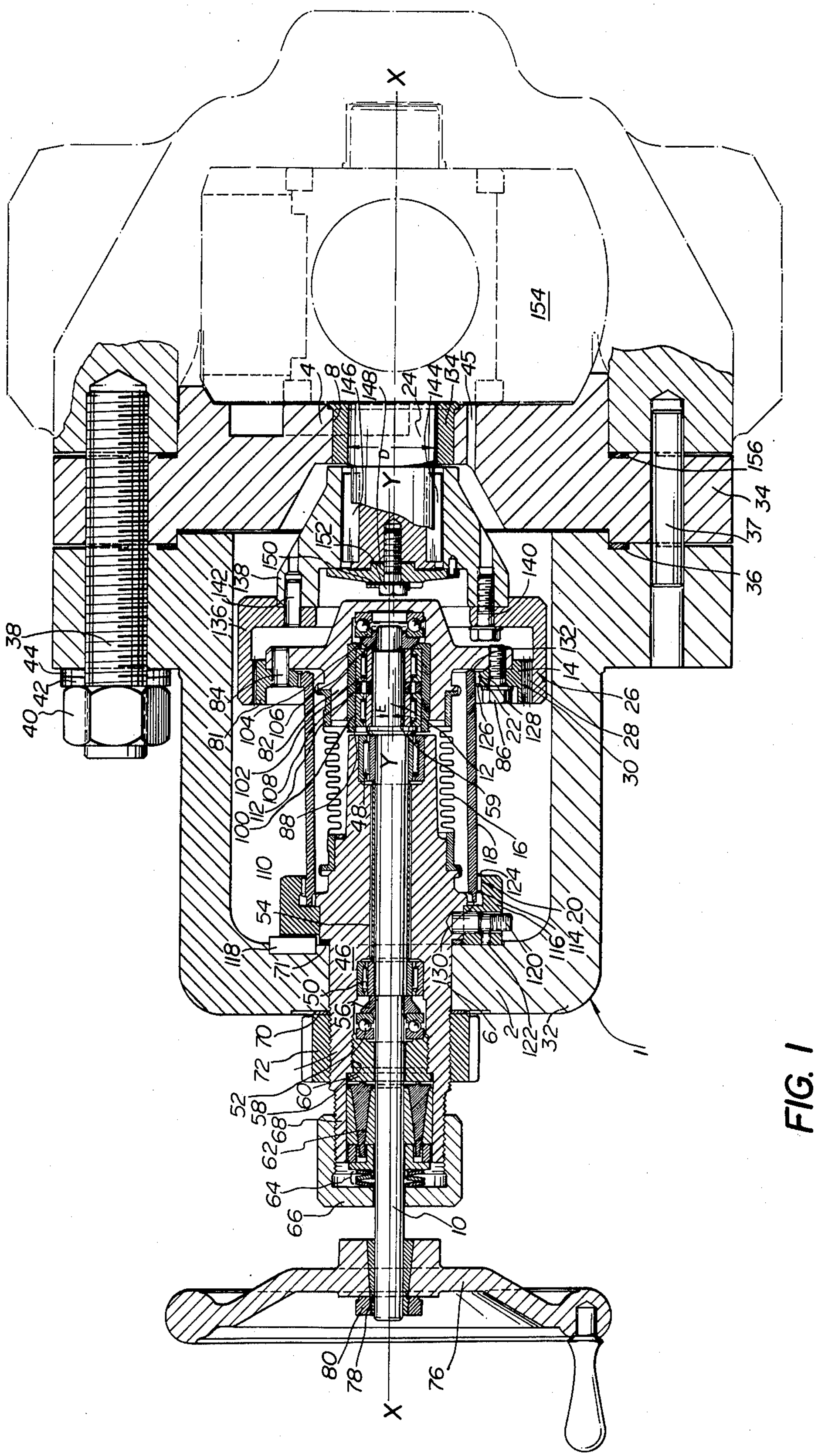

United States Patent [19]

Astill

[11] 4,178,815

[45] Dec. 18, 1979

[54] SEALED TORQUE TRANSMISSION ASSEMBLY

[75] Inventor: Cyril J. Astill, Deep River, Canada

[73] Assignee: Atomic Energy of Canada Limited, Ottawa, Canada

[21] Appl. No.: 857,110

[22] Filed: Dec. 2, 1977

[30] Foreign Application Priority Data

Feb. 16, 1977 [CA] Canada .................................. 271874

[51] Int. Cl.[2] ................................................ F16H 1/28

[52] U.S. Cl. ........................................................ 74/805

[58] Field of Search ........................... 74/805, 640, 804

[56] References Cited

U.S. PATENT DOCUMENTS

| | | | |
|---|---|---|---|
| 2,137,303 | 11/1938 | Nelson | 74/805 X |
| 3,082,632 | 3/1963 | Vulliez | 74/804 X |
| 3,161,082 | 12/1964 | Musser | 74/640 |
| 3,546,972 | 12/1970 | Morozumi | 74/804 |
| 3,668,947 | 6/1972 | Waldorff | 74/804 |
| 3,747,434 | 7/1973 | Stahlhuth | 74/640 |

FOREIGN PATENT DOCUMENTS

| | | | |
|---|---|---|---|
| 1027372 | 5/1953 | France | 74/805 |

*Primary Examiner*—Lance Chandler
*Attorney, Agent, or Firm*—Francis W. Lemon

[57] ABSTRACT

A sealed torque transmission assembly comprising a casing having a drive shaft rotatably mounted to extend through a wall portion into the casing and terminate with an eccentric end portion which is parallel with the axis of rotation of the drive shaft. An externally toothed, non-rotating driving gear is mounted on a bearing on the eccentric end portion and held against rotation by an anti-rotation sleeve which is coupled by involute teeth at one to the casing and at the other end to the driving gear. A flexible bellows around the drive shaft seals the externally toothed, non-rotating drive gear to the casing. An internally toothed driven gear, having a greater number of teeth than the driving gear and teeth which mesh with at least one tooth of the drive gear, is mounted on a driven shaft which is also mounted for rotation in a wall portion of the casing. Rotation of the drive shaft causes the driving gear to move around on the eccentric end portion while being held against rotation by the anti-rotation sleeve so that the teeth of the drive gear sequentially engage teeth of the driven gear and rotate the driven gear and driven shaft at a reduced rate to that of the driving shaft. The driving gear moves in a plane normal to the axis of rotation of the drive shaft thus minimizing flexing of the flexible bellows and increasing the life of the flexible bellows.

2 Claims, 2 Drawing Figures

SEALED TORQUE TRANSMISSION ASSEMBLY

This invention relates to a sealed torque transmission assembly.

There is a need for a sealed torque transmission assembly which is hermetically sealed and wherein the hermetic seal is reliable for a long enough period of time for the hermetic seal not to require replacement after unduly short periods of operation of the torque transmission assembly.

In U.S. Pat. No., 3,306,134, dated Feb. 28, 1967, "Wabble Gear Drive Mechanism," F. J. Winiarski, there is described a torque transmission assembly wherein a driving gear with external teeth is held by a sealing bellows against rotation and mounted by a bearing on a cylindrical sleeve. The cylindrical sleeve is in turn rotatably mounted on an output shaft by means of another bearing to rotate about the axis of rotation of the output shaft. The axis of rotation of the driving gear bearing is offset at an angle to the axis of rotation of the output shaft so that rotation of the cylindrical sleeve causes the driving gear to wabble. The teeth of the driving gear mesh at a single point with a greater number of internal teeth of an output gear mounted on the output shaft for rotation therewith. In operation, rotation of the cylindrical sleeve causes the driving gear to wabble and sequentially engage teeth thereof with teeth of the output gear and thus rotate the output shaft by rotating the output gear.

While the driving mechanism of Winiarski is undoubtedly a useful hermetically sealed mechanism it would be desirable to increase the useful life of the bellows.

It is an object of the present invention to provide a sealed torque transmission assembly which is sealed by a flexible bellows and wherein the useful life of the flexible bellows is longer than that of known torque transmission assemblies which are sealed by a flexible bellows.

According to the present invention there is provided a sealed torque transmission assembly, comprising:

(a) a casing with wall portions having a drive shaft opening and a driven shaft opening aligned therewith, (b) a drive shaft having an eccentric portion and rotatably mounted in a fluidtight manner in the casing for rotation about a first axis and extending through the drive shaft opening with the eccentric portion within the casing, the eccentric portion extending along a second axis which is parallel with the first axis, (c) an externally toothed driving gear mounted coaxially on the eccentric portion of the drive shaft for relative rotation therewith about the second axis, (d) a flexible bellows enclosing the portion of the drive shaft within the casing and sealed in a fluidtight manner at one end to the casing and at the other end to the externally toothed driving gear, (e) an anti-rotation sleeve around the portion of the drive shaft within the casing, (f) casing, universal coupling means coupling one end of the anti-rotation sleeve against relative rotation to the casing, (g) driving gear, universal coupling means coupling the other end of the anti-rotation sleeve against relative rotation to the driving gear, (h) a driven shaft rotatably mounted in the casing and extending through the driven shaft opening and into the casing, and (i) an internally toothed driven gear having a greater number of teeth than the driving gear, mounted on the driven shaft for rotation therewith, with the internal teeth thereof meshing with at least one external tooth to one side only of the driving gear, and wherein (j) the axis of the eccentric portion of the drive shaft is parallel to and radially offset from the axis of rotation of the drive shaft by an amount 't', where:

$$t = (PCDi - PCDe)/2,$$

and where

PCDi = The pitch circle diameter of the teeth of the internally toothed driven gear, and PCDe = The pitch circle diameter of the teeth of the externally toothed driving gear.

Preferably, (a) the casing, universal coupling means comprises involute gear teeth held against rotation by attachment to the casing around the drive shaft opening, and a first group of involute gear teeth attached to and around one end of the anti-rotation sleeve and meshing with the involute gear teeth attached to the casing, and (b) the driving gear, universal coupling means comprises involute gear teeth attached to the driving gear, and a second group of involute gear teeth attached to and around the other end of the anti-rotation sleeve and meshing with the involute gear teeth attached to the driving gear, In some embodiments of the present invention the flexible bellows is within the anti-rotation sleeve.

In other embodiments of the present invention the eccentric portion of the drive shaft is an end portion thereof in the casing, and the externally toothed driving gear comprises an externally toothed ring and an inner, flanged end cap with the externally toothed ring mounted thereon, the inner, flanged end cap is mounted for the relative rotation on the eccentric portion of the drive shaft, and the flexible bellows is sealed to the inner, flanged end cap, whereby, in use the outer portion of the casing interior around the flexible bellows is an elevated fluid pressure side of the flexible bellows seal, and the elevated fluid pressure urges the inner, flanged end cap on the eccentric portion of the driving shaft.

In other embodiments of the present invention a sleeve extends through the drive shaft opening in the casing and is sealed in a fluidtight manner to the casing, the drive shaft extends along the sleeve interior, is sealed to the sleeve to the sleeve in a fluidtight manner, and is rotatably supported by the sleeve at spaced positions therealong.

Figure 2:
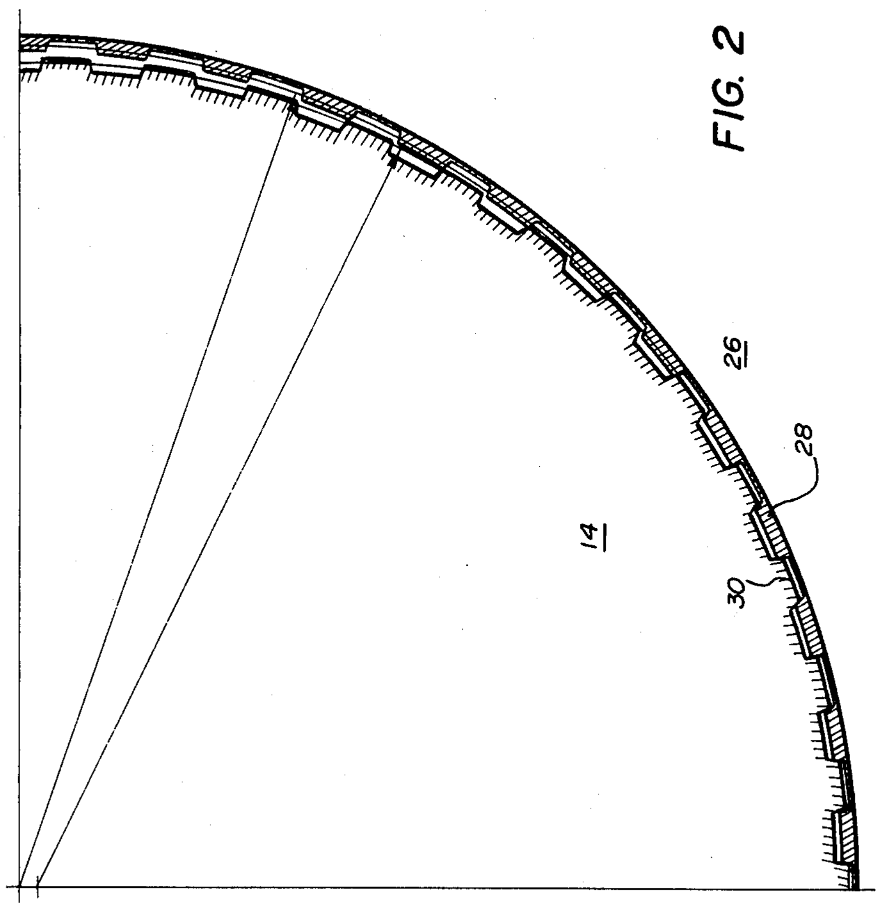

In the accompanying drawings which illustrate, by way of example, an embodiment of the present invention, FIG. 1 is a sectional side view of a sealed torque transmission assembly, and FIG. 2 is a sectional side view of a meshing portion of gear teeth shown in FIG. 1.

Referring to FIGS. 1 and 2 there is shown a torque transmission assembly comprising:

(a) a casing 1 with wall portions 2 and 4 having a drive shaft opening 6 and a driven shaft opening 8 aligned therewith, (b) a drive shaft 10 having an eccentric portion 12 end rotatably mounted in a fluidtight manner in the casing 1 for rotation about a first axis XX and extending through the drive shaft opening 6 with the eccentric portion 12 within the casing 1, the eccentric portion 12 extending along a second axis YY which is parallel with the first axis XX, (c) an externally toothed driving gear 14 mounted coaxially on the eccentric portion 12 of the drive shaft 10 for relative rotation therewith about the second axis YY, (d) a flexible bellows 16 enclosing the portion of the drive shaft 10 within the casing 1 and sealed in a fluidtight manner at one end to the casing 1 and at the other end to the externally toothed driving gear 14, (e) an anti-rotation sleeve 18 around the portion of the drive shaft 10 within the casing 1, (f) casing, universal coupling means 20 coupling one end of the anti-rotation sleeve 18 against relative rotation to the casing, (g) driving gear, universal coupling means 22 coupling the other end of the anti-rotation sleeve 18 against relative rotation to the driving gear 14, (h) a driven shaft 24 rotatably mounted in the casing 1 and extending through the driven shaft opening 8 and into the casing 1, and (i) an internally toothed driven gear 26 having a greater number of teeth 28 than the driving gear 14, mounted on the driven shaft 24 for rotation therewith, with the internal teeth 28 thereof meshing with at least one external tooth 30 to one side only of the driving gear 14, and wherein (j) the axis YY of the eccentric portion 12 of the drive shaft 10 is parallel to and radially offset from the axis of rotation XX of the drive shaft 10 by an amount 't', where:

$$t = (PCDi - PCDe)/2,$$

and where

PCDi = The pitch circle diameter of the teeth of the internally toothed driven gear 26, and PCDe = The pitch circle diameter of the teeth of the externally toothed driving gear 14.

The casing, universal coupling means 20 comprises involute gear teeth held against rotation by attachment to the casing 1 around the drive shaft opening 6, and a first group of involute gear teeth attached to and around one end of the anti-rotation sleeve 18 and meshing with the involute gear teeth attached to the casing 1.

The driving gear, universal coupling means 22 comprises involute gear teeth attached to the driving gear 14, and a second group of involute gear teeth attached to and around the other end of the anti-rotation sleeve 18 and meshing with the involute gear teeth attached to the driving gear 14.

The casing 1 comprises a cup-shaped portion 32 and a wall portion 34 which are sealed together by a sealing ring 36, located radially by a dowel pin 37, and clamped together by screw threaded studs, and nuts and, washers, such as screw threaded stud 38 and nut 40 and washers 42 and 44. The wall portion 34 has a fluid passage 45.

The drive shaft 10 is rotatably mounted in the cup-shaped portion 32 by means of a sleeve 46, side thrust roller bearings 48 and 50 and end thrust ball bearing 52, all positioned on the drive shaft by spacer sleeves 54 and 56 and secured thereon by an externally screw threaded ring 58, which is screwed into a threaded recess 60 in the sleeve 46, and collar 59 on the drive shaft 10.

The drive shaft 10 is sealed in the sleeve 46 by a wedge seal 62 which is held in place by Belleville washers 64 and an internally screw threaded cap 66 which is screwed on to an externally threaded end portion 68 of the sleeve 46. The sleeve 46 is sealed to the casing 1 by a seal 71, and is clamped in the drive shaft opening 6 by means of a clamping nut 72 and anti-friction washer 70 on an externally screw threaded portion 74 of the sleeve 46.

The drive shaft 10 has a hand wheel 76 secured thereon for rotation therewith by a collet 78 and a nut 80. In other embodiments of the present invention the drive shaft is driven by, for example, an electric, hydraulic or pneumatic motor.

The externally toothed driving gear 14 comprises an externally toothed ring 81, an inner, flanged end cap 82, a dowel pin 84 and bolts (one of which is shown and designated 86). The externally toothed gear 14 is mounted for rotation on the eccentric portion 12 by means of a bearing sleeve 88, side thrust roller bearings 100 and 102, and end thrust ball bearing 104 in the flanged end cap 82. The roller bearings 100 and 102 and ball bearing 104 are located on the eccentric portion 12 by spacer rings 106 and 108.

The flexible bellows 16 are sealed at one end to the casing 1 by a ferrule 110 sealing an end of the flexible bellows 16 to the sleeve 46, and at the other end to the externally toothed gear by a ferrule 112 sealing the other end of the flexible bellows 16 to the flanged end cap 82.

As will be shown later, in this embodiment of the present invention, the space in the casing 1 which is external to the flexible bellows 16 and so the flanged end cap 82 is the high fluid pressure side of the bellows seal, and so the pressure differential across the flexible bellows 16 and the flanged end cap 82 is in the direction to retain the end cap on the eccentric portion 12 while the assembly is in use. When the assembly is not in use the limited movement of the flanged end cap 82 is insufficient to dislodge any parts of the assembly on the eccentric portion 12.

One half of the casing, universal coupling means generally designated 20 comprises internal involute gear teeth 114 on a collar 116 which is held against rotation by two keys, one of which is shown and designated 118, and attached to the casing 1 by being mounted on the sleeve 46 and secured thereto by a plug 120 and a set screw 122.

The other half of the casing, universal, coupling means generally designated 20 comprises a first group of external involute gear teeth 124 attached to and around one of the anti-rotation sleeve 18.

One half of the driving gear, universal coupling means generally designated 22 comprises internal involute gear teeth 126 attached to the externally toothed ring 81 of the externally toothed driving gear 14. The other half of the driving gear, universal coupling generally designated 22 comprises a second group of external involute gear teeth 128 attached to and around the other end of the anti-rotation sleeve 18.

The anti-rotation sleeve 18 has rounded ends 130 and 132 for rolling contact with the collar 116 and the flanged end cap 82 respectively.

The driven shaft 24 is rotatably mounted in the wall portion 4 of the casing 1 by means of a bearing 134.

The internally toothed driven gear generally designated 26 comprises an internally toothed ring 136 secured to a mounting sleeve 138 by bolts, one of which is shown and designated 140, and a dowel pin 142. The mounted sleeve 138 is mounted on the driven shaft 24 for rotation therewith by keys 144 and 146, and is held thereon by a disc 148, a washer 150 and a bolt 152.

In this embodiment of the present invention the torque transmission assembly is shown with the driven shaft 24 als being the actuating shaft of a rotary valve 154, shown chain-dotted. The rotary valve 154 is of the type described in U.S. Pat. No. 3,894,714, dated July 15, 1975, "Rotary Valve," S. J. Whittaker and C. J. Astill. The wall portion 34 of the casing 1 is secured to the casing of the rotary valve 154 by the bolts, one of which is shown and designated 38 and dowel pin 37, and is sealed thereto by a seal 156 so that the bellows 16 and the flanged end cap 82 are exposed externally to the high fluid pressure side of the valve 154 through the fluid passage 45.

This embodiment of the present invention was designed for actuating a valve in a nuclear reactor and in this particular application the wedge seal 62 is mandatory to avoid a catastrophic leak should the flexible bellows 16 fail.

In operation rotation of the handwheel 76 to open or close the rotary valve 154 will move the eccentric portion 12 of the driving shaft 10 around the axis of rotation XX along a path radially spaced therefrom by the distance between axes XX and YY. The axis YY of the eccentric portion 12 always remains parallel with the axis XX of rotation of the driving shaft 10.

As the eccentric portion 12 moves around the axis XX the external teeth 30 of the driving gear 14 are sequentially meshed with the internal teeth 28 of the driven gear 26 as shown in FIG. 2. This occurs because the anti-rotation sleeve 18 wobbles about the driving shaft 10 by means of the involute gear teeth 114, 124 and 126, 128 to accommodate the eccentric movement of the driving gear 14 but prevents rotation of the driving gear 14 about the axis YY.

In order for at least one internal tooth 28 to mesh with at least one external tooth 30, as shown in FIG. 2, the driving gear 14 must have less teeth than the driven gear 26. This different number of teeth causes the driving gear 14 to rotate the driven gear 26 in the same direction as that in which the teeth 28 and 30 sequentially engage and either open or close the rotary valve 154.

A gear reduction system torque transmission of the type shown in FIGS. 1 and 2 preferably uses a modified involute form of gear teeth, the diametral pitch and modified depth of which can be generally be determined thus:

(a) Choose a suitable Pitch Circle Diameter (PCD) for the internally toothed driven gear 26 to suit the application.

(b) To find the P.C.D. of the externally toothed driving gear 14 apply the formula:

$$\frac{\textit{P.C.D.}\text{ of Internally Toothed Driven Gear}}{\textit{P.C.D.}\text{ of Internally Toothed Driven Gear} - \textit{P.C.P.}\ \textit{P.C.D.}\text{ of Externally Toothed Driven Gear}} = \text{RATIO}$$

-continued (c) The eccentric offset of the externally toothed driving gear $$= \frac{\textit{P.C.D.}\text{ of Internally Toothed Driven Gear} - \textit{P.C.D.}\text{ of Externally Toothed Driven Gear}}{2}$$

(d) The standard addendum tooth form of the externally toothed driving gear should not be less than 50% of the eccentric offset of the externally toothed driving gear $$\therefore \text{Suitable Standard Diametral Pitch} = \frac{1}{0.5 \times \text{Eccentric Offset}}$$

(e) The modified addendum of the teeth of the externally toothed driving gear used in this embodiment = 25% of the Eccentric Offset.

(f) The modified dedendum of the externally toothed driving gear = Modified addendum + Standard clearance.

(g) The gear tooth form obtained as described above can then be used to determine the width of gear necessary to suit the application.

EXAMPLE 1

A 50:1 gear reduction is required and the most suitable Pitch Circle Diameter of the internally toothed driven gear is 6.250".

$$\frac{6.250}{50} = 6.250 - \textit{P.C.P.}\text{ of Externally Toothed driving gear}$$

$$0.125 = 6.250 - 6.125$$

$$\therefore \textit{P.C.D.}\text{ Externally Toothed Driving Gear} = 6.125''$$

$$\text{Eccentric offset} = \frac{0.125}{2} = 0.0625''$$

Suitable $D$. Pitch of the Externally Toothed Driving Gear =

$$\frac{1}{0.5 \times 0.0625} = \frac{1}{.03125} = 32$$

Modified addendum of the Externally Toothed Driving Gear
$= 0.250 \times 0.0625$
$= 0.0156.$ Modified dedendum of the Externally Toothed Driving Gear
$= 0.0156\ .005$
$= 0.0206.$ Using the above calculations the following are the details of a typical torque transmission assembly of the type shown in FIGS. 1 and 2:

Eccentric E = 0.0625 inches
Driving shaft (10) diameter (d) ¾ inch
Driven shaft (24) diameter (D) 2 inches The teeth of the externally toothed driving gear 14 and internally toothed driven gear 26 each cut with 20° pressure angle-involute form cutters modified to produce the desired shallow depth of tooth below the pitch circle diameter.

Externally toothed driving gear 14 has 49 teeth with a 6.125 inch pitch circle diameter, 6.075 inch root diameter, 6.155 inch top diameter and a standard tooth thickness. Internally toothed driving gear 26 has 50 teeth with a 6.250 inch pitch circle diameter, 6.300 inch top or root diameter, 6.300 inch top or root diameter, 6.220 inch inside diameter and standard tooth thickness.

Giving a 50:1 gear reduction ratio.

EXAMPLE 2

An 8:1 gear ratio is required and the most suitable Pitch Circle Diameter of the Internal Toothed Driven Gear is 2.000"

$$\frac{2.000}{8} = 2.000 - P.C.D \text{ of the Externally Toothed Driving Gear}$$

$$.250 = 2.000 - 1.750''$$

$$P.C.D. \text{ of the Externally Toothed Driving Gear} = 1.750''$$

$$\text{Eccentric offset} = \frac{.250}{2} = .125''$$

$$\text{Suitable } D. \text{ Pitch of the Externally Toothed Driving Gear} = \frac{1}{.500 \times .125} = \frac{1}{.0625} = 16$$

$$\text{Modified addendum of the Externally Toothed Driving Gear} = 0.25 \times 0.125'' = 0.03125''$$

$$\text{Modified dedendum of the Externally Toothed Driving Gear} = 0.3125 + .0098 = 0.3223.$$

It will be seen that in contrast to the torque transmission device of Winiarski described in the previously mentioned U.S. Pat. No. 3,306,134 wherein the driving gear has a wobble motion, the externally toothed driving gear 14 of the present invention moves in a plane normal to the axis XX and so flexing of the bellows is substantially reduced and the life of the bellows extended when compared with the bellows of the Winiarski device.

I claim:

1. A sealed torque transmission assembly comprising:

(a) a casing with wall portions having a drive shaft opening and a driven shaft opening aligned therewith, (b) a drive shaft having an eccentric portion and rotatably mounted in a fluidtight manner in the casing for rotation about a first axis and extending through the drive shaft opening with the eccentric portion within the casing, the eccentric portion extending along a second axis which is parallel with the first axis, (c) an externally toothed driving gear mounted coaxially on the eccentric portion of the drive shaft for relative rotation therewith about the second axis, (d) a flexible bellows enclosing the portion of the drive shaft within the casing and sealed in a fluidtight manner at one end to the casing and at the other end to the externally toothed driving gear, (e) an anti-rotation sleeve around the portion of the drive shaft within the casing, (f) casing, universal coupling means coupling one end of the anti-rotation sleeve against relative rotation to the casing, (g) driving gear, universal coupling means coupling the other end of the anti-rotation sleeve against relative rotation to the driving gear, (h) a driven shaft rotatably mounted in the casing and extending through the driven shaft opening and into the casing, and (i) an internally toothed driven gear, having a greater number of teeth than the driving gear, mounted on the driven shaft for rotation therewith, with the internal teeth thereof meshing with at least one external tooth to one side only of the driving gear, and wherein (j) the axis of the eccentric portion of the drive shaft is parallel to and radially offset from the axis of rotation of the drive shaft by an amount 't', where:

$$t = (PCDi - PCDe)2,$$

and where:

PCDi = The pitch circle diameter of the teeth of the internally toothed driven gear, and PCDe = The pitch circle diameter of the teeth of the externally toothed driving gear.

2. An assembly according to claim 1, wherein (a) the casing universal coupling means comprises involute gear teeth held against rotation by attachment to the casing around the drive shaft opening, and a first group of involute gear teeth attached to and around one end of the anti-rotation sleeve and meshing with the involute gear teeth attached to the casing, and (b) the driving gear, universal coupling means comprises involute gear teeth attached to the driving gear, and a second group of involute gear teeth attached to and around the other end of the anti-rotation sleeve and meshing with the involute gear teeth attached to the driving gear.

* * * * *